Oct. 21, 1969     J. H. KRENZ     3,473,847
HUB AND SPOKE CONSTRUCTION FOR WIRE WHEELS
Filed Jan. 29, 1968
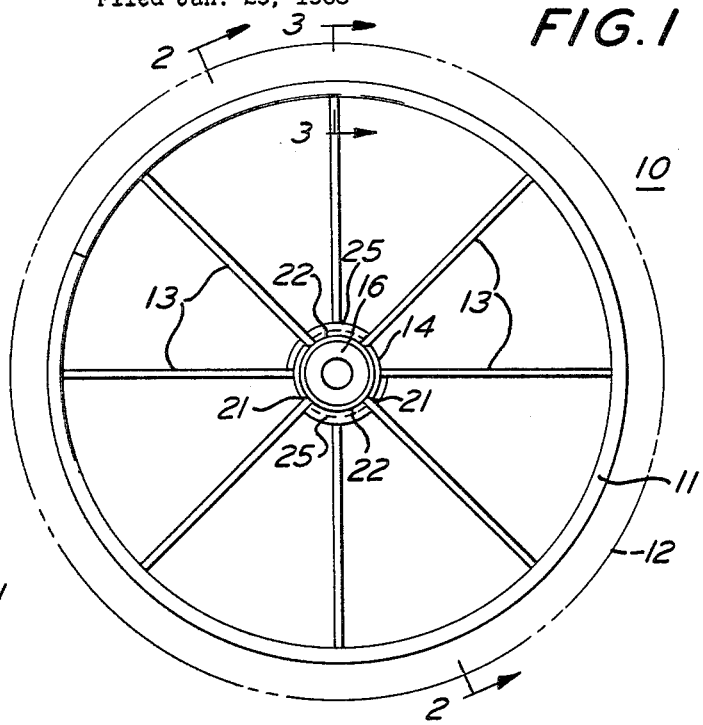
FIG.1
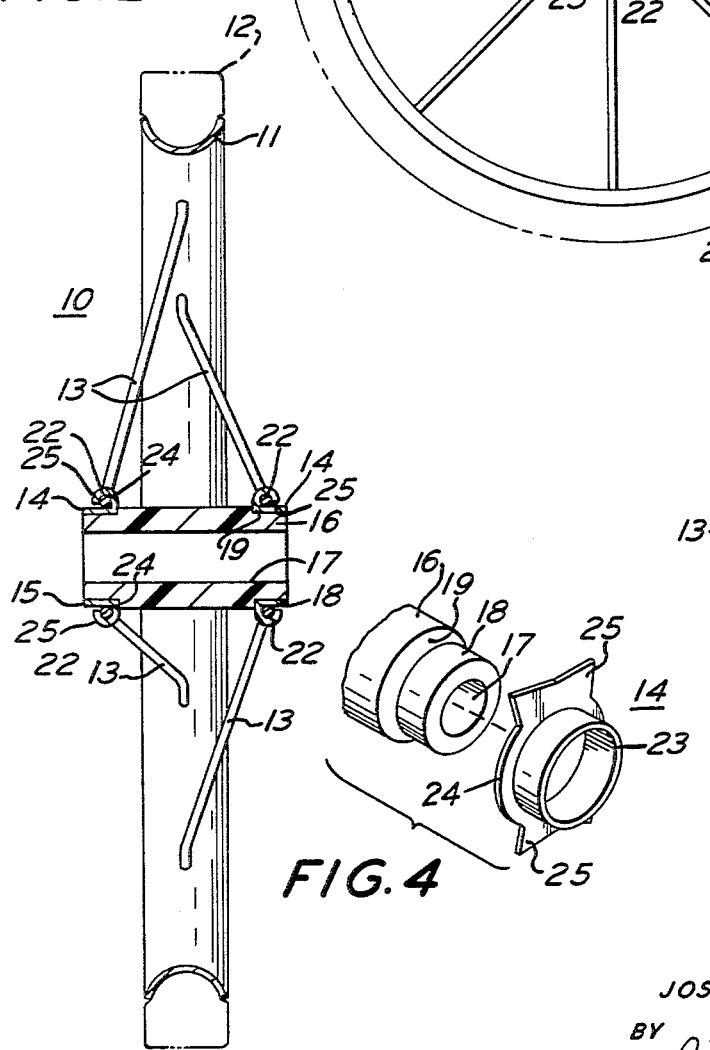
FIG.2
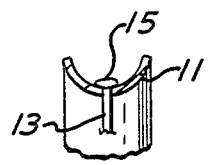
FIG.3
FIG.4
INVENTOR
JOSEPH H. KRENZ
BY
ATTORNEY

United States Patent Office 3,473,847
Patented Oct. 21, 1969

3,473,847
HUB AND SPOKE CONSTRUCTION
FOR WIRE WHEELS
Joseph H. Krenz, c/o Krenz Wheel Manufacturing Co.,
110 Harbor Lane, Somers Point, N.J. 08244
Filed Jan. 29, 1968, Ser. No. 701,170
Int. Cl. B60b 1/04
U.S. Cl. 301—57       2 Claims

ABSTRACT OF THE DISCLOSURE

A hub and spoke construction for wire wheels in which the spokes are carried at their inner ends by hub flange elements on reduced ends of a hub sleeve of moisture resistant low coefficient of friction synthetic plastic material. The inner ends of the spokes are connected by arcuate connectors which are staggered with respect to arcuate connectors at the other end of the hub sleeve.

BACKGROUND OF THE INVENTION

Field of the invention

This invention relates to a hub and spoke construction for wire wheels.

Description of the prior art

Various mountings for the inner ends of the spokes in wire wheels have heretofore been proposed. In one common type of construction inner and outer discs or plates have been employed, the discs being held together by rivets with the inner V-shaped ends of spokes secured therebetween, and the assembly being carried on a hub. In another common type of construction the outer discs or flanges are looped around the spokes, and extend outwardly independent of the hub sleeve. This hub assembly has inadequate strength and is costly due to the excess material required.

In my prior U.S. Patent No. 3,199,922 there is shown an improved hub and spoke construction but this requires a multiplicity of parts for assembly including a metal stamping of some complexity. Such a stamping is not required with the construction of the present invention which is of simplified nature and with improved orientation of the wheel rim and hub.

SUMMARY OF THE INVENTION

In accordance with the invention, a hub and spoke construction is provided which includes a central hub sleeve with end shoulders on which hub flange elements having cylindrical collars with flanges and spoke engaging rim portions are carried which engage the inner portions of wire spokes, the hub flange elements being simple in construction and readily assembled to the sleeve and spokes.

It is the principal object of the present invention to provide a hub and spoke construction for wire wheels which is sturdy, simple in construction, easy to assemble and free from difficulties in use.

It is a further object of the present invention to provide a hub and spoke construction for wire wheels which utilizes one component formed as a metal stamping within which the inner ends of the spokes are assembled and which is received and retained on a cylindrical hub sleeve of low coefficient of friction.

It is a further object of the present invention to provide a hub and spoke construction with which improved orientation of the spokes with respect to the hub is effected.

It is a further object of the present invention to provide a hub and spoke construction for wire wheels which can be more readily assembled than structures heretofore available and with an improved end product.

Other objects and advantageous features of the invention will be apparent from the description and claims.

BRIEF DESCRIPTION OF THE DRAWINGS

The nature and characteristic features of the invention will be more readily understood from the following decription taken in connection with the accompanying drawings forming part thereof, in which:

FIGURE 1 is a side elevation of a wheel in accordance with the invention;

FIG. 2 is a transverse sectional view, enlarged, taken approximately on the line 2—2 of FIG. 1;

FIG. 3 is a transverse sectional view, enlarged, taken approximately on the line 3—3 of FIG. 2; and FIG. 4 is a fragmentary exploded perspective view showing details of the end of the hub and of the hub flange element.

It should, of course, be understood that the description and drawings herein are illustrative merely, and that various modifications and changes can be made in the structure disclosed without departing from the spirit of the invention.

DESCRIPTION OF THE PREFERRED EMBODIMENT

Referring now more particularly to the drawings, the wheel 10 there shown has a rim 11, arcuate in cross section, for the circumferential mounting of a tire 12 of tubular or solid rubber and of well-known type.

Spokes 13 are provided extending as hereinafter explained, from hub flange elements 14 to and through the rim 11 to which they are secured by upsetting or enlargement at their outer ends as at 15 in FIG. 3.

The hub flange elements 14 are carried on a cylindrical hub sleeve 16. The hub sleeve 16 has a central bore 17 for mounting on a shaft (not shown). The hub sleeve 16 is preferably of a synthetic plastic material which is unaffected by moisture, and which has a low coefficient of friction with respect to the metal shaft on which it is carried. For this purpose nylon is satisfactory as is high density polyethylene. The hub sleeve 16 has reduced circumferential ends 17 extending to shoulders 19.

The spoke 13 are preferably of round wire, extend radially and outwardly to their ends 15, are shaped for this purpose as indicated in FIG. 2 and have bends 21 joining each pair of spokes 13 to central arcuate spoke connectors 22. The radius of curvature of the connectors is slightly greater than that of the reduced ends 18 to accommodate the flange elements 14.

The hub flange elements 14 have collars 23 which engage and are carried on the ends 18, have flanges 24 which engage the shoulders 19, and holding rims 25 extending from the flanges 24 over and in engagement with the arcuate spokes connectors 22, between the bends 21.

With a hub flange element 14 at each end of the hub sleeve 16 the spoke connectors 22 at one end are preferably in staggered relation to the connectors 22 at the other end. The bending of the holding rims 25 to engage over the connectors 22 is effected at assembly of the hub flange elements 14 into the hub sleeve 16 and of the spokes 13 to the hub flange elements 14 and to the rim 11.

The assembly of the hub flange elements 14 into the hub sleeve 16 and of the spokes 13 thereto and to the rim 11 also facilitates obtaining proper positioning and orientation of the rim 11 with respect to the sleeve 16 and its central bore 17.

It will thus be seen that a structure has been provided for attaining the objects of the invention.

I claim:
1. A wheel hub construction comprising
   a hub sleeve having a central shaft bore and reduced exterior circumferential ends extending inwardly to shoulders,
   said hub sleeve being of synthetic plastic material of a low coefficient of friction,
   hub flange elements at each end of said sleeve and each having a cylindrical collar on and in engagement with one of said ends, and
   wire spoke means having radial portions and a connecting portion between said radial portions accuately curved, conforming to and carried directly on said collars,
   said hub flange elements having integral outwardly disposed rim portions clampingly engaging said arcuate connecting portions of said spokes.

2. A wheel hub construction as defined in claim 1 in which
   said hub flange elements have flanges extending from said collars and from which said holding rims extend.

References Cited

UNITED STATES PATENTS

| | | | |
|---|---|---|---|
| 719,282 | 1/1903 | Wagner | 301—57 |
| 1,095,298 | 5/1914 | Thorspeck | 301—57 |
| 1,164,292 | 12/1915 | Ledig | 301—57 |
| 3,199,922 | 8/1965 | Krenz | 301—59 |
| 3,304,135 | 2/1967 | Hasselmark | 308—238 X |

FOREIGN PATENTS 443,877   3/1936   Great Britain.

RICHARD J. JOHNSON, Primary Examiner

UNITED STATES PATENT OFFICE
CERTIFICATE OF CORRECTION

Patent No. 3,473,847　　　　　　　　　　　　October 21, 1969

Joseph H. Krenz

It is certified that error appears in the above identified patent and that said Letters Patent are hereby corrected as shown below:

Column 3, line 12, after "radial portions" the word "accuately" should read -- arcuately --.

Signed and sealed this 20th day of January 1970.

(SEAL)
Attest:

Edward M. Fletcher, Jr.　　　　　　　　WILLIAM E. SCHUYLER, JR
Attesting Officer　　　　　　　　　　　　Commissioner of Patents